United States Patent [19]

Zlokovitz

[11] Patent Number: 5,047,965

[45] Date of Patent: Sep. 10, 1991

[54] MICROPROCESSOR CONTROLLED GAS PRESSURE REGULATOR

[76] Inventor: Robert J. Zlokovitz, 20 Villanova La., Dix Hills, N.Y. 11746

[21] Appl. No.: 523,723

[22] Filed: May 15, 1990

Related U.S. Application Data

[63] Continuation-in-part of Ser. No. 293,647, Jan. 5, 1989, abandoned.

[51] Int. Cl.⁵ .............................................. G06F 15/46
[52] U.S. Cl. .............................. 364/558; 137/624.11; 137/624.2; 137/487; 364/510
[58] Field of Search .................... 73/861.01-861.03, 73/199, 708, 709, 861.44, 861.47, 861.53; 364/509, 510, 558, 465, 550; 137/624.11, 624.14, 236.1, 624.2, 455, 487, 487.5, 484.4, 488, 501, 468, 7, 10, 88

[56] References Cited

U.S. PATENT DOCUMENTS

| | | | |
|---|---|---|---|
| 4,200,911 | 4/1980 | Matsumoto | 364/510 |
| 4,569,012 | 2/1986 | Sekozawa et al. | 364/510 |
| 4,720,807 | 1/1988 | Ferran et al. | 364/558 |
| 4,729,106 | 3/1988 | Rush et al. | 364/465 |
| 4,811,221 | 3/1989 | Sturman et al. | 364/510 |
| 4,827,426 | 5/1989 | Patton et al. | 364/465 |
| 4,835,717 | 5/1989 | Michel et al. | 364/558 |
| 4,839,790 | 6/1989 | Fujimoto et al. | 73/861.02 |
| 4,866,633 | 9/1989 | Nakane et al. | 364/510 |

Primary Examiner—Kevin J. Teska
Attorney, Agent, or Firm—Brooks Haidt Haffner & Delahunty

[57] ABSTRACT

Adjustment of a gas regulator valve having a spring biased diaphragm controlled pilot valve is automatically effected by supplying augmenting pressure to the spring side of the diaphragm via an electrically adjustable regulator valve under the control of a local microprocessor. Historical pressure drop data as a function of day of the week, time of day, and ambient temperature is stored in the microprocessor. A temperature sensor provides the microprocessor with a signal indicative of ambient temperature, and this is correlated with the stored historical data to determine the adjustment for the main regulator valve.

17 Claims, 4 Drawing Sheets

MICROPROCESSOR CONTROLLED GAS PRESSURE REGULATOR

BACKGROUND OF THE INVENTION

This application is a continuation-in-part of my prior application, Ser. No. 07/293,647, filed Jan. 5, 1989 now abandoned.

The present invention relates to the distribution of natural gas or the like and, in particular, to the regulation of the pressure at low pressure regulator stations located at selected points in the distribution network of a gas supply utility.

In a typical gas distribution system the gas is fed under an elevated pressure from a supply source through distribution mains to various regulator stations. Usually, each regulator station supplies a network of distribution mains radiating to remote terminations with, in certain networks, cross connections between the mains supplied from different regulator stations. The regulator stations function to reduce the gas pressure to limits considered safe for customer usage. To ensure against extinguishment of flames throughout the system with the attendant dangers of explosion and asphyxiation, pressures have to be maintained such that at least a predetermined minimum pressure exists at the extremities of the network for all pressure drops encountered over the range of demand. Since the demand changes with time of day, day of the week and ambient temperature, it has heretofore been the practice to maintain pressures at the regulator station supply points at a sufficiently high level that the minimum pressure at the system low points would never fall below the pressure established as a safe minimum. A typical standard requires a minimum pressure everywhere along the supply network of 4.5 inches water column (w.c.), which, based upon experience, has necessitated that the regulator supply point pressure be maintained at least at about 9 or 10 inches w.c.

The pressure required at a regulator station varies from hour to hour depending on the changing load. The regulator outlet pressure required at the peak hours and the off-peak hours can differ by up to 4 to 5 inches w.c. Thus, during most of the day, a higher pressure than that required to satisfy the off peak demand must be maintained to handle the demand during the peak hours.

Unfortunately, the higher pressures contribute to increased loss to the public utility. Since the gas meters used at customer sites are not pressure compensated, gas delivered to the customer at say 8 inches w.c. as compared to 6 inches w.c. is under-registered by about 0.5%. In addition, the network piping is not entirely leak proof and leakage increases in direct proportion to increasing pressure. This adds to lost and unaccounted for gas. Leakage represents real cost, both in terms of the value of gas lost from the system and the cost to repair those leaks considered hazardous.

Various attempts have been made to regulate the gas supply in accordance with demand, but these all rely on the use of a single computer coupled to the various regulator valves in a closed control loop with pressure sensors at key locations in the network. To implement such central control equipment it is necessary to link the computer with the regulator site as well as the sites of the pressure transducers by means of telephone lines or radio links or the like. If the central computer fails or the communication link fails, the entire system is disabled. So far such systems have not met with widespread acceptance.

SUMMARY OF THE PRESENT INVENTION

It is therefore an object of the present invention to provide self-contained, local control at each regulator station providing increased reliability and greater simplicity.

Another object of the present invention is to provide apparatus for automatically changing the adjustment of regulator valves right at the regulator site to maintain regulator outlet pressure only slightly above the level required to ensure maintenance of the safe minimum at system extremities.

Yet another object of the present invention is to reduce loss of gas though pipe leakage by enabling an overall lowering of the average gas pressure through the distribution piping network.

Still another object of the invention is to provide local microprocessor control of district gas regulator valves.

In accordance with one aspect of the present invention there is provided a pressure regulating arrangement for a gas distribution system. The regulating arrangement includes means responsive to the pressure of a controlling input fluid for controlling the pressure of a gas entering a supply distribution network. Also included are means for supplying gas under pressure and electrically controllable means coupled between said gas supplying means and said pressure controlling means for applying to the latter means a controlling input fluid under pressure for determining said pressure of gas entering said distribution network. A microprocessor is provided for storing historical downstream pressure drop data and is coupled to said electrically controllable means for applying controlling signals to the latter means.

In accordance with another aspect of the present invention there is provided a method of regulating the pressure in a gas distribution system which involves the steps of providing at a supply point in said distribution system a microprocessor and a regulator valve assembly under control of the microprocessor. The microprocessor is supplied with historical data relating downstream pressure drop to day of the week, time of day and ambient temperature, as well as actual outdoor ambient temperature information. The gas pressure entering said supply point is automatically regulated responsive to said temperature information and historical data to be at least within 1.0 inch water column pressure above the pressure dictated by said ambient temperature and historical data for the particular time of day and day of the week to be required to maintain at the lowest pressure point in the distribution system a predetermined minimum pressure after taking into account the anticipated pressure drop based upon said historical data and temperature.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts.

DETAILED DESCRIPTION OF THE PRESENTLY PREFERRED EMBODIMENTS

Figure 1:
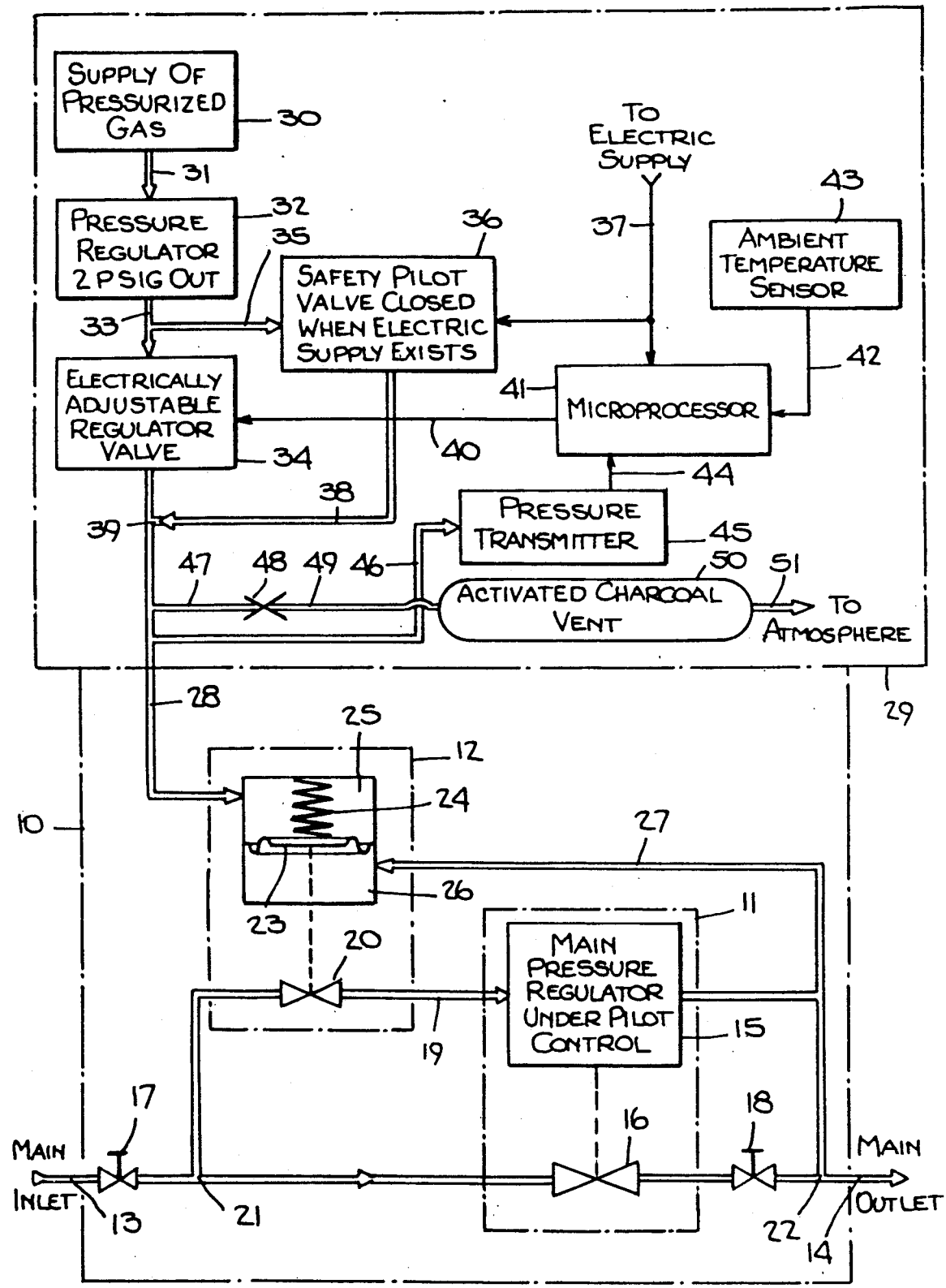
FIG. 1 is a schematic diagram of one embodiment of the control system.

Referring to FIG. 1, there is shown schematically a pressure regulating arrangement for a gas distribution system in which a pressure regulating valve assembly 10 consisting of a main pressure regulator 11 under control of a pilot valve 12, is connected in series with a gas line having an inlet 13 and an outlet 14. The main pressure regulator is of known construction with a spring loaded diaphragm (not shown) in a control chamber 15 arranged to control a main valve 16 connected in series with the main pipeline inlet 13 and 14. The usual shut-off valves 17 and 18 are located on either side of the valve 16. Modulating pressure is applied to the diaphragm in the main pressure regulator chamber 15 from a bypass line 19 passing through valve 20 in pilot valve 12 from tap point 21 upstream of valve 16 to tap point 22 downstream of valves 16 and 18.

The valve 20 is controlled, in turn, by its own diaphragm 23 biased by spring 24 within chamber 25. The valve closing side, chamber 26, of diaphragm 23 is supplied with gas from tap point 22 via feedback conduit 27. In known manner the controlled downstream pressure is used to oppose the forces developed on diaphragm 23 by biasing spring 24 and by the fluid pressure of pressurized fluid received in chamber 25 by way of conduit 28.

The apparatus for supplying the conduit 28 with pressurized fluid is shown within the phantom outline box 29. A supply of pressurized gas 30, either of compressed air or the gas being distributed by the system, has an output 31 coupled through a pressure regulator 32. The regulator 32 is arranged to provide a constant output pressure of 2 p.s.i.g., supplying the pressurized gas over conduit 33 to an electrically controllable regulator valve 34, and over conduit 35 to an electrically controlled pilot valve 36 which is arranged to be in the valve-closed condition so long as it is supplied with electric current from a supply line 37. The regulated output from valve 34 is connected directly to conduit 28. In addition, the output from valve 36 is connected by conduit 38 to conduit 28 at junction 39.

The electrically adjustable regulator valve 34 is controlled by current supplied over lead 40 from a microprocessor 41. The microprocessor 41, in turn, receives data input signals over lead 42 from an ambient temperature sensor 43, and over lead 44 from a pressure transmitter 45 connected by conduit 46 to conduit 28.

Finally, conduit 28 is connected by conduit 47 through a locking needle valve 48, conduit 49, and an activated charcoal filter 50 to an atmospheric vent 51.

It is presently preferred to use "Fisher" Y600 pressure regulators for valves 34 and 36. In valve 34 a "Fisher" Type 661 Remote Control Pilot Drive Unit is used to adjust the Type Y600 regulator. In valve 36 the Type Y600 regulator is preceded by an "Asco" N.O. watertight solenoid valve. This operates off 120 V. line voltage from line 37 and is held "closed" when supply voltage is present. If there should occur a power failure or interruption, the solenoid valve will open supplying gas to the interconnected Y600 regulator for supplying such gas at a preset pressure over line 38 to conduit 28.

Microprocessor 41 is implemented by the Hewlett-Packard HP 48050A Measurement and Control Unit, while ambient temperature sensor 43 is implemented by a "Fisher" Type TE 1240 Resistance Temperature Transmitter. The pressure transmitter 45 is preferably a "Fisher" Type 1151DP Differential Pressure Transmitter. Filter 50 can be a "Becker" charcoal canister.

A "Fisher" Type 1098 regulator is preferred for regulator 11, while a "Fisher" Y-600P pilot regulator implements valve 12 with its spring biased pneumatically adjustable diaphragm 23.

Figure 2:
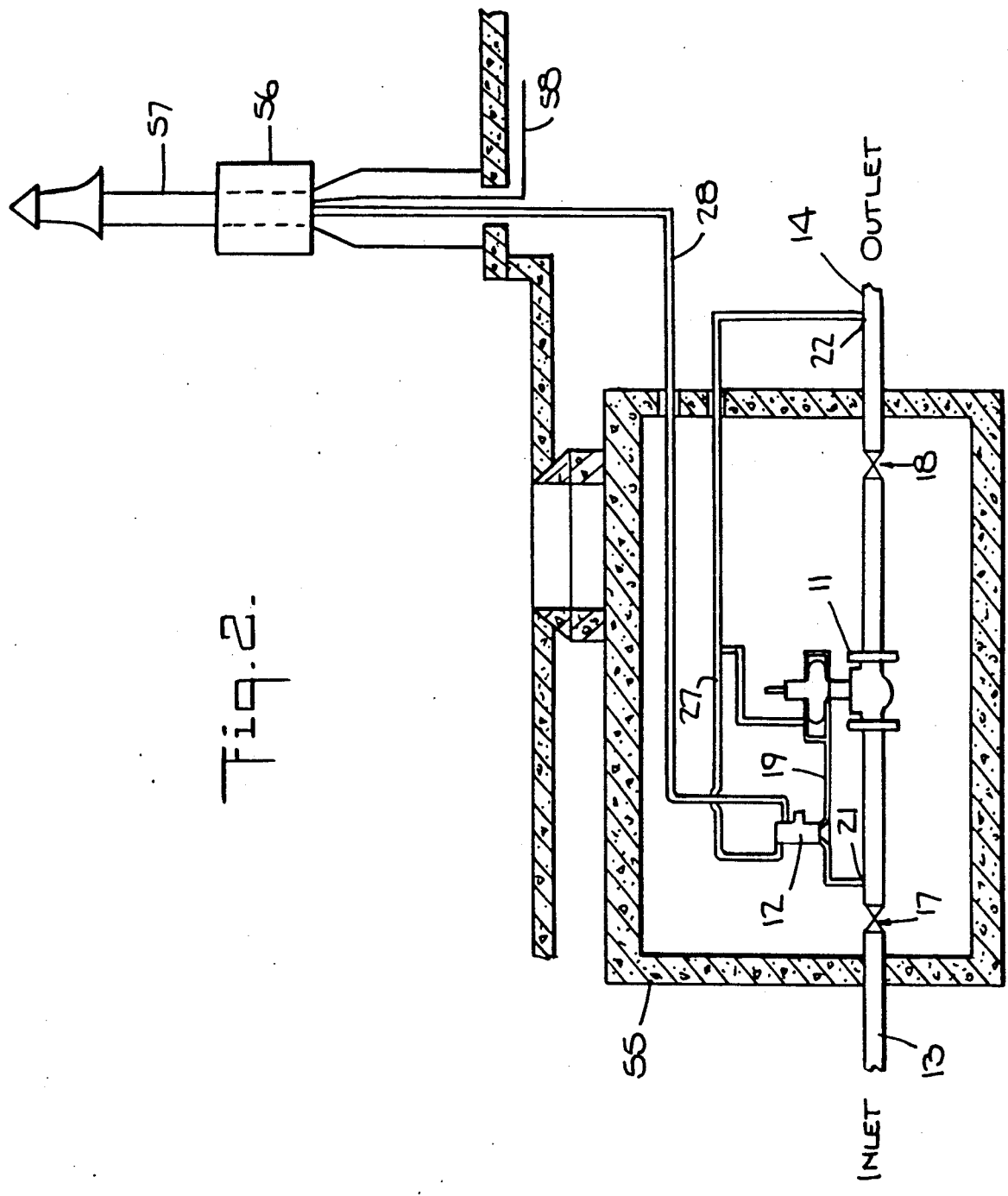
FIG. 2 is a somewhat schematic illustration of the street installation including the valving located in the manhole and the apparatus mounted on the above ground post.

Before describing the operation of the system, reference should be had to FIG. 2 which illustrates diagrammatically an actual street installation. As shown, all of the components within phantom box 10 in FIG. 1 are installed in a below street manhole 55, while the components within box 29 of FIG. 1, being all of the components under electric control, are installed in one or more boxes 56 mounted on an above ground post 57. Electric power for the electric supply 37 is shown furnished by cable 58 from underground mains, not shown. However, battery or solar power can be used if desired.

In operation of the described system, the spring loaded pilot regulator 12 is boosted to higher pressure settings by the microprocessor 41 which operates the gas or air supply pilot 34 and delivers 2-10 inches water column pressure to the pilot regulator 12 in the manhole. In a typical system the regulator 12 would have its biasing spring 24 adjusted to maintain via regulator 11 an output pressure at main outlet 14 equal to about 3 inches w.c. For normal winter operation the microprocessor 41 will adjust valve 34 to boost valve 12 by about 5 to 5½ inches w.c. so that the operating output at peak demand is maintained at about 8, or 8½ inches w.c. Depending upon day of the week, time of day, outside temperature, and the historical pressure drop data relating thereto stored in microprocessor 41, the adjustment of primary regulator 10 will vary between, say, about 5 inches w.c. on the low side and about 10 inches w.c. on the high side although these figures are not absolute limits.

From FIG. 1 it will be observed that the microprocessor 41 is electrically powered from the same supply 37 as the safety pilot 36. Pilot 36 is preferably adjusted such that when the series solenoid valve (not shown) opens upon interruption of electric power, pressure in conduit 28 will be maintained at about 5½ inches w.c. so that primary regulator 10 maintains an output pressure of about 8½ inches w.c. at output 14. This is to ensure safe pressure at the network extremities for all anticipated demand.

The pressure required at a typical regulator station varies from hour to hour depending on the changing load. It has been found that in one utility distribution network the regulator outlet pressure supplying outlet 14 required at the peak hour and the off-peak hours can differ by as much as 4 or 5 inches w.c. Thus, the microprocessor will be arranged to vary automatically the regulated output pressure up and down several inches w.c. depending upon the measured outdoor ambient temperature and the stored historical data as to the anticipated load induced pressure drop for the particular day of the week and time of day at the sensed temperature.

By requiring no electric power in the manholes, the risk of explosion is not increased by adding the subject controls to an existing distribution network. Moreover, with the microprocessor located above ground, it is very convenient to alter its programming should that become necessary.

Figure 3:
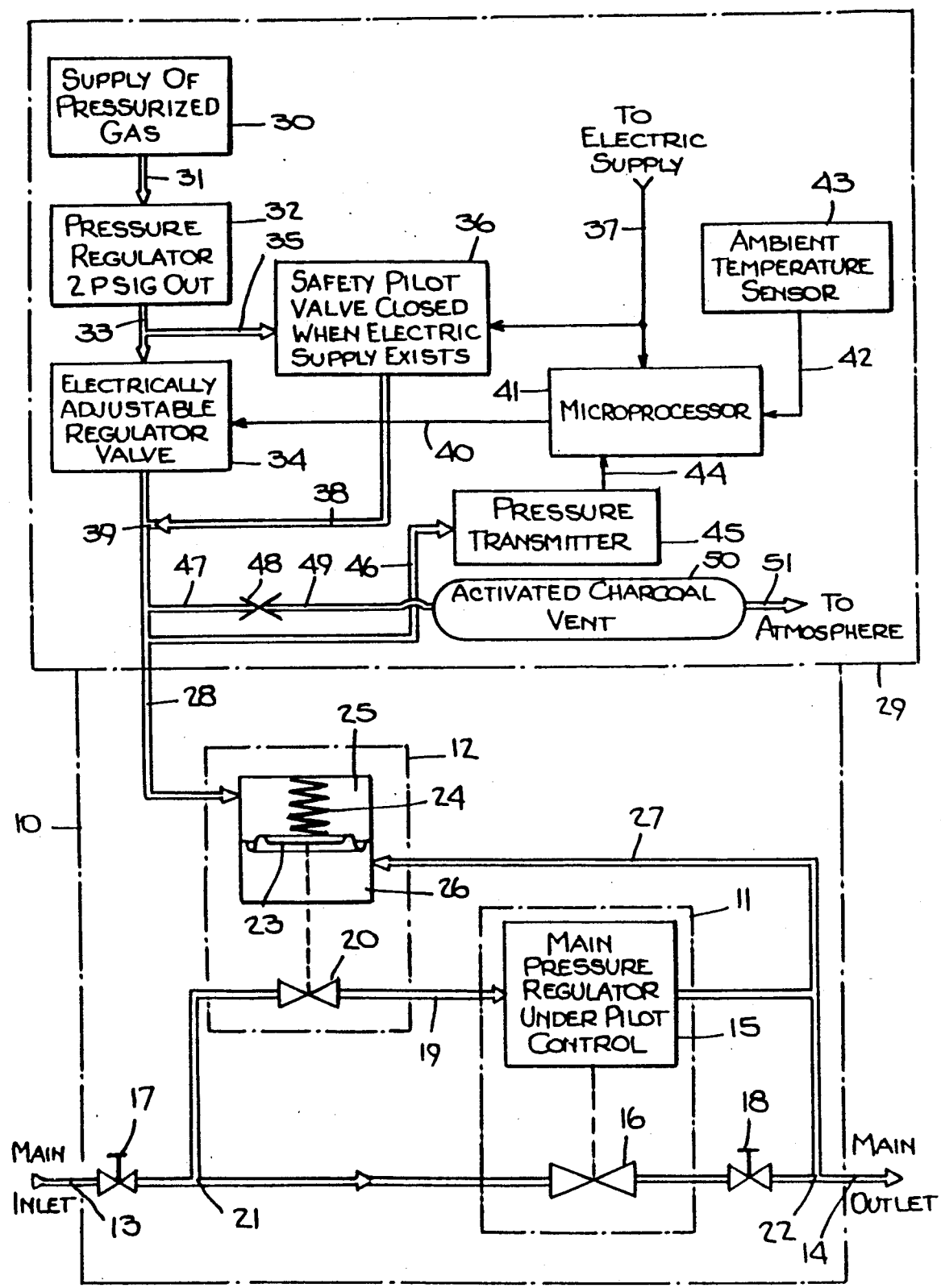
FIG. 3 is a diagram similar to that of FIG. 1 showing another embodiment of the invention.

With a slight modification of the system of FIG. 1 in the manner shown in FIG. 3, the output pressure at the supply point 14 can be maintained within about 0.1 inches w.c. of the design pressure for the particular ambient conditions. Referring to FIG. 3, the feedback conduit to pressure transmitter 45, the conduit 46 in FIG. 1, is replaced by conduit 60 connected with main outlet line 14 via line 27. With this simple change, the sensitivity of the control system is greatly enhanced.

Also, as shown in FIG. 3, a modem 61 of any suitable construction can as a preferred option be connected between the microprocessor 41 and a communication channel or line 62. In known fashion, the public utility can communicate with microprocessor 41 for any one of a number of purposes. The data recorded in the microprocessor can be checked periodically. New instructions can be delivered to the microprocessor. An operating check can be run on the microprocessor, and so forth. However, in contrast to other known systems, no communication link to a central computer is required for the local microprocessor to exercise its control. The microprocessor, situated right at the regulator site, automatically performs the required control functions without outside control. Also, no remote pressure transducers are required at remote nodes.

Figure 4:
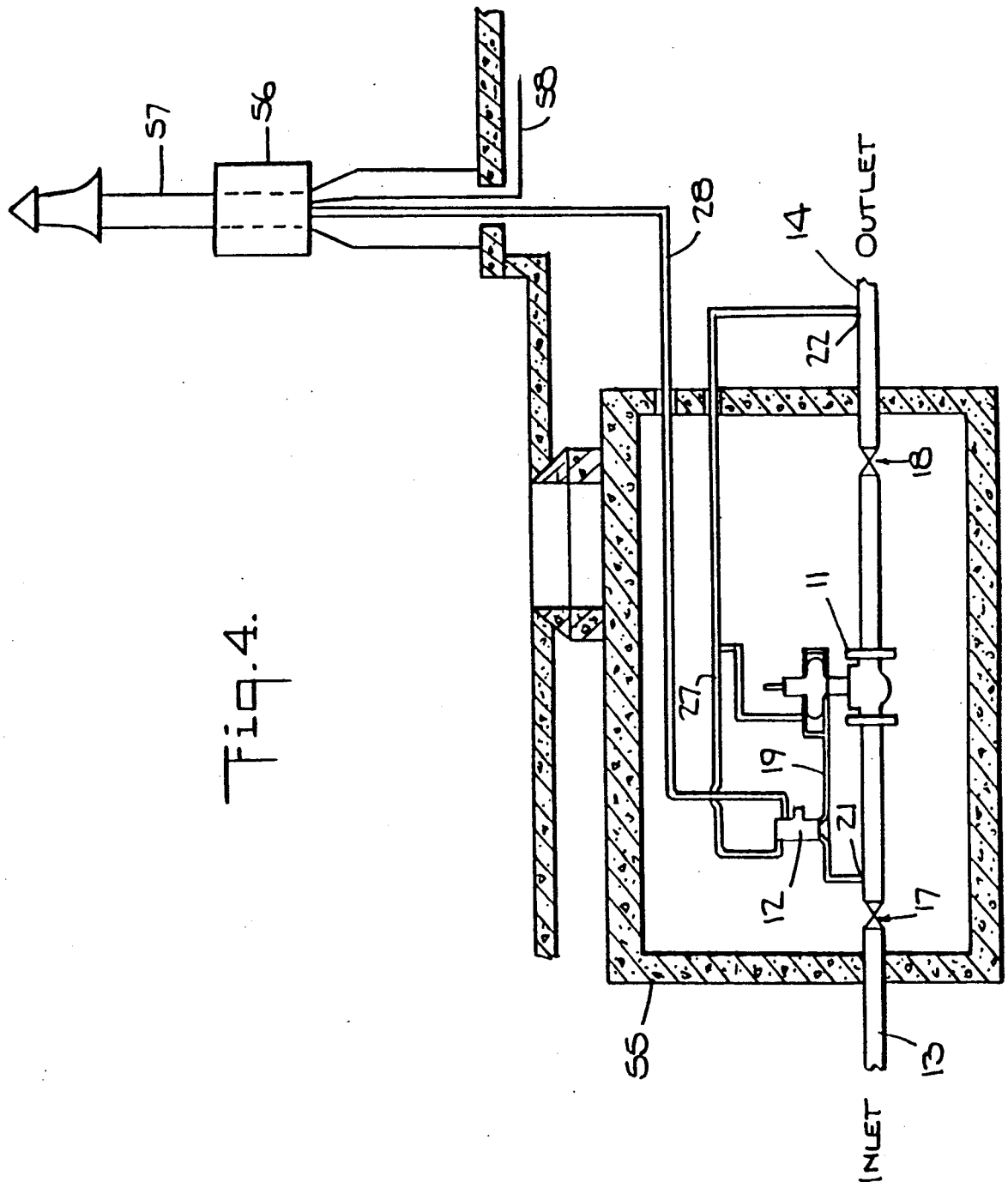
FIG. 4 is a schematic illustration, similar to FIG. 2 but representing the modification of FIG. 3.

FIG. 4 shows the comparable change to the field installation embodying the system of FIG. 3. The overall operation of the system of FIGS. 3 and 4 will be essentially the same as that described for FIGS. 1 and 2.

The historical data to be used will depend upon the particular geographic location. Each user will have to collect data over a period of time at some predetermined interval. Pressure recording instruments can be placed at the output of a regulator station and at the lowest pressure point in the network fed by such regulator station. The difference between the two pressure readings represents the pressure drop. At the time a pressure reading is taken, a record is also made of the time of day, day of the week, and ambient temperature. This data is stored in the local microprocessor which includes a clock calendar and the ambient temperature sensor. The method of storage can follow any suitable well known procedure.

Having described the present invention with reference to the presently preferred embodiment thereof, it should be understood that various changes in construction can be introduced by those skilled in the subject art without departing from the true spirit of the invention as defined in the appended claims.

What is claimed is:

1. A pressure regulating arrangement for a gas distribution system comprising in combination, means responsive to the pressure of a controlling gas for controlling the pressure of a gas entering a supply distribution network, means for supplying pressurized gas, electrically controllable means interconnecting said pressurized gas supplying means and said pressure controlling means for applying to the latter means controlling gas under pressure for determining said pressure of gas entering said distribution network, and a microprocessor for storing historical downstream pressure drop data coupled to said electrically controllable means for applying controlling signals to the latter means.

2. A pressure regulating arrangement according to claim 1, further comprising an external temperature sensor coupled electrically to said microprocessor for providing said microprocessor with an ambient temperature signal.

3. A pressure regulating arrangement for a gas distribution system comprising in combination, a first pressure regulating valve assembly including a spring loaded pressure responsive valve-controlling mechanism, a supply of pressurized gas, an electrically controllable pressure regulating valve interconnecting said supply of pressurized gas and said valve-controlling mechanism for augmenting the loading of said spring loaded mechanism, and a microprocessor coupled controllingly to said electrically controllable pressure regulating valve for modifying the setting of said first pressure regulating valve assembly in accordance with a predetermined program.

4. A pressure regulating arrangement according to claim 3, further comprising a pressure responsive device having an input coupled to an output from said electrically controllable pressure regulating valve and having an output coupled to said microprocessor.

5. A pressure regulating arrangement according to claim 3, further comprising an electrically operable valve assembly having a valve-closed condition when electrically energized and a valve-opened condition in the absence of energizing voltage, said electrically operable valve assembly being coupled in shunt to said electrically controllable pressure regulating valve for bypassing the latter valve when supply of electric voltage is interrupted to said electrically operable valve assembly.

6. A pressure regulating arrangement according to claim 3, further comprising a pressure responsive device having an input coupled to an output of said first pressure regulating valve assembly and having an output coupled to said microprocessor.

7. A pressure regulating arrangement according to claim 3, further comprising an external temperature sensor coupled electrically to said microprocessor for providing said microprocessor with an ambient temperature signal.

8. A pressure regulating arrangement according to claim 7, further comprising a pressure responsive device having an input coupled to an output from said electrically controllable pressure regulating valve and having an output coupled to said microprocessor.

9. A pressure regulating arrangement according to claim 7, wherein said spring loaded pressure responsive valve-controlling mechanism is, in the absence of load augmenting pressurizing gas, spring biased for causing said pressure regulating valve assembly to maintain a supply pressure to said gas distribution system of approximately 3 inches water column, and said microprocessor and valve-controlling mechanism are constructed to supply augmenting pressurizing gas at pressures within the range of 2 to about 10 inches water column.

10. A pressure regulating arrangement according to claim 7, further comprising a pressure responsive device having an input coupled to an output of said first pressure regulating valve assembly and having an output coupled to said microprocessor.

11. A pressure regulating arrangement according to claim 3, wherein said microprocessor includes a real-time clock-calendar and means for storing historical data relating downstream gas pressure drop to day of the week, time of day and ambient temperature; and an ambient temperature sensor for sensing outdoor temperature is coupled to said microprocessor.

12. A pressure regulating arrangement according to claim 11, further comprising an electrically operable valve assembly having a valve-closed condition when electrically energized and a valve-opened condition in the absence of energizing voltage, said electrically operable valve assembly being coupled in shunt to said electrically controllable pressure regulating valve for bypassing the latter valve when supply of electric voltage is interrupted to said electrically operable valve assembly.

13. A pressure regulating arrangement according to claim 11, further comprising a pressure responsive device having an input coupled to an output from said electrically controllable pressure regulating valve and having an output coupled to said microprocessor.

14. A pressure regulating arrangement according to claim 13, further comprising an electrically operable valve assembly having a valve-closed condition when electrically energized and a valve-opened condition in the absence of energizing voltage, said electrically operable valve assembly being coupled in shunt to said electrically controllable pressure regulating valve for bypassing the latter valve when supply of electric voltage is interrupted to said electrically operable valve assembly.

15. A pressure regulating arrangement according to claim 11, further comprising a pressure responsive device having an input coupled to an output of said first pressure regulating valve assembly and having an output coupled to said microprocessor.

16. A pressure regulating arrangement according to claim 15, further comprising an electrically operable valve assembly having a valve-closed condition when electrically energized and a valve-opened condition in the absence of energizing voltage, said electrically operable valve assembly being coupled in shunt to said electrically controllable pressure regulating valve for bypassing the latter valve when supply of electric voltage is interrupted to said electrically operable valve assembly.

17. A method of regulating the pressure in a gas distribution system which comprises in combination the steps of providing at a supply point in said distribution system a microprocessor and a regulator valve assembly under control of the microprocessor, supplying said microprocessor with historical data relating downstream pressure drop to day of the week, time of day and ambient temperature, supplying said microprocessor with outdoor ambient temperature information, and automatically regulating the gas pressure entering said supply point responsive to said temperature information and historical data to be within 1 inch water column pressure above the pressure dictated by said ambient temperature and historical data for the particular time of day and day of the week to be required to maintain at the lowest pressure point in the distribution system a predetermined minimum pressure after taking into account the anticipated pressure drop based upon said historical data and temperature.

* * * * *